United States Patent
Gilson et al.

(10) Patent No.: US 10,383,060 B2
(45) Date of Patent: Aug. 13, 2019

(54) SYSTEMS AND METHODS FOR USING A MOBILE GATEWAY IN A LOW POWER WIDE AREA NETWORK

(71) Applicant: Comcast Cable Communications, LLC, Philadelphia, PA (US)

(72) Inventors: Ross Gilson, Philadelphia, PA (US); William Carroll VerSteeg, Buford, GA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 4 days.

(21) Appl. No.: 15/689,798

(22) Filed: Aug. 29, 2017

(65) Prior Publication Data

US 2019/0069241 A1 Feb. 28, 2019

(51) Int. Cl.
| | | |
|---|---|---|
| *H04W 52/02* | (2009.01) | |
| *H04L 1/16* | (2006.01) | |
| *H04L 29/08* | (2006.01) | |
| *H04W 4/38* | (2018.01) | |
| *H04W 4/70* | (2018.01) | |
| *H04W 88/16* | (2009.01) | |

(52) U.S. Cl.
CPC ........ *H04W 52/0241* (2013.01); *H04L 1/1607* (2013.01); *H04L 67/12* (2013.01); *H04W 4/38* (2018.02); *H04W 4/70* (2018.02); *H04W 52/0216* (2013.01); *H04W 88/16* (2013.01)

(58) Field of Classification Search
CPC ..... H04W 28/76; H04W 76/02; H04W 36/00; H04W 72/12; H04W 52/02; H04L 43/028; H04L 47/10; H04L 47/14; H04L 47/803; H04L 1/16

USPC .................. 370/311, 328, 332, 401
See application file for complete search history.

(56) References Cited

U.S. PATENT DOCUMENTS

| | | | | |
|---|---|---|---|---|
| 9,167,430 | B2* | 10/2015 | Zhao | H04W 12/06 |
| 9,301,205 | B2* | 3/2016 | Ghai | H04L 43/028 |
| 9,338,820 | B2* | 5/2016 | Rikkinen | H04W 88/04 |
| 9,652,955 | B1* | 5/2017 | Ray | G01S 5/0081 |
| 9,929,771 | B2* | 3/2018 | Rose | H04B 1/44 |
| 2010/0022184 | A1* | 1/2010 | Khoshnevis | H04B 7/2606 455/7 |
| 2011/0176467 | A1 | 7/2011 | Lampe et al. | |
| 2012/0213148 | A1* | 8/2012 | Saito | H04B 7/15542 370/315 |
| 2017/0086054 | A1 | 3/2017 | Azevedo et al. | |
| 2017/0366194 | A1* | 12/2017 | Sennoun | H04W 72/048 |
| 2018/0124590 | A1* | 5/2018 | O'Connell | H04W 8/02 |
| 2018/0176718 | A1* | 6/2018 | VerSteeg | H04W 64/00 |
| 2018/0176862 | A1* | 6/2018 | Malas | H04L 67/2823 |

* cited by examiner

*Primary Examiner* — Man U Phan
(74) *Attorney, Agent, or Firm* — BakerHostetler

(57) ABSTRACT

Systems and methods for effectuating communication in a low power wide area network using a mobile data-handling device are disclosed. A method may comprise moving a mobile data-handling device to a first position that is within communication range of an end node of a low power wide area network. The mobile data-handling device may receive a data packet from the end node and may move to a second position at which the mobile data-handling device connects to a data-receiving device. The mobile data-handling device may transmit, via the data-receiving device, the data packet to a computing system for further processing.

20 Claims, 8 Drawing Sheets

SYSTEMS AND METHODS FOR USING A MOBILE GATEWAY IN A LOW POWER WIDE AREA NETWORK

BACKGROUND

In the Internet of Things (IoT) model, a wide variety of objects may be equipped with embedded electronics (e.g., processor, memory, sensor, actuator, network interface, etc.) that enable these objects to collect and exchange data across a communication network, which often includes, at least in part, a wireless communication network. For example, a home's gas meter may be configured with electronics to collect and store the quantity of gas provided to the home and to later transmit that data to the gas company's central server. As another example, sensor(s) positioned in a lawn may be configured to collect and store information representing the amount of water applied to the lawn and/or information on the nutrient content of the lawn's soil. This information relating to the lawn may be wirelessly transmitted to an upstream server for evaluation and monitoring. In many cases, the embedded electronics are unconnected to an external power source and must be powered by battery.

As one measure to conserve power, low power wide area networks (LPWAN) have been implemented. In an LPWAN, the electronics embedded in objects (referred to as "end nodes" or "sensors") transmit and receive data typically only at various intervals determined by the end node, as opposed to continuously being in a mode to transmit and receive data, which consumes power. The end nodes may communicate, via wireless radio transmission, with one or more gateways. The gateway(s) may then relay the data further upstream over a fixed backhaul network. However, situations may arise in which the end node is not within range of any gateways. For example, the aforementioned gas meter may be located at a rural location that is outside the range of any gateways. Further, the low concentration of end nodes at that rural location may make it undesirable to implement one or more gateways that cover the location.

These and other shortcomings are addressed in the present disclosure.

SUMMARY

Systems and methods are disclosed for effectuating communication in a low power wide area network using a mobile data-handling device. A method may comprise moving a mobile data-handling device to a first position that is within communication range of an end node of a low power wide area network. The mobile data-handling device may receive a data packet from the end node while the mobile gateway is at the first position. The mobile data-handling device may move to a second position at which the mobile data-handling device is able to communicate data-receiving device associated with the low power wide area network. The mobile data-handling device may be caused to connect, at the second position, to the data-receiving device. The mobile data-handling device may transmit the data packet to the data-receiving device. A first acknowledgment may have been transmitted by the mobile data-handling device and to the end node in response to the mobile data-handling device receiving the data packet from the end node. The first acknowledgement may be a MAC layer acknowledgement and may indicate that the data packet was received by the mobile data-handling device. A second acknowledgement may be been received from the data-receiving device and by the mobile data-handling device that indicates that the data packet was received, via the data-receiving device, by a computing device associated with the low power wide area network. The second acknowledgement may be an application layer acknowledgement. The second acknowledgement may be transmitted to the end node by the mobile data-handling device.

A method may comprise transmitting schedule information to an end node of a low power wide area network. The schedule information may be indicative of a time period for a mobile data-handling device to be within communication range of the end node. The mobile data-handling device may move to a first position that is within communication range of the end node. The mobile data-handling device may transmit, during the time period indicated in the schedule information, a message to the end node. The message may indicate that the mobile data-handling device is within communication range of the end node. The mobile data-handling device may receive a data packet from the end node. The mobile data-handling device may transmit the data packet to a computing device associated with the low power wide area network.

A method may comprise identifying a mobile data-handling device by an end node of a low power wide area network. The mobile data-handling device may be in communication range of the end node. The end node may receive a notification that a data-handling device other than the mobile data-handling device is within communication range of the end node. Responsive to receiving the notification that a data-handling device other than the mobile data-handling device is within communication range of the end node, the end node may cause to adjust an operational parameter of the mobile data-handling device or the end node. The end node may transmit a data packet to the mobile data-handling device. The end node may receive an acknowledgment from the mobile data-handling device that indicates that the mobile data-handling device received the data packet. The acknowledgment may be received according to at least the adjusted operational parameter.

BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION

Figure 1:
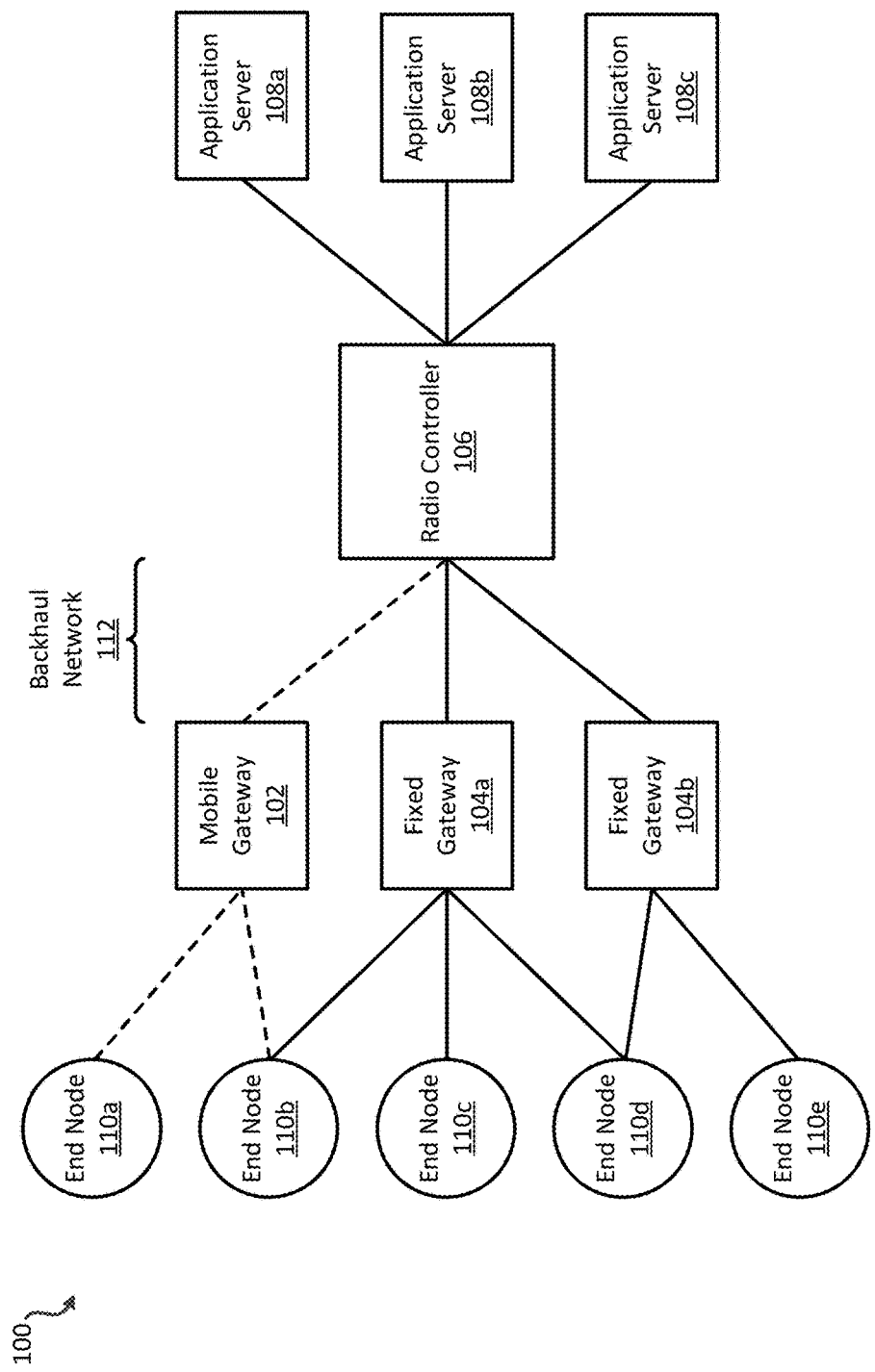
FIG. 1 illustrates a block diagram of an example system according to an embodiment of the present disclosure.

The systems and methods of the present disclosure relate to communications in a low power wide area network (LPWAN) that are effectuated using a mobile gateway. In a low power wide area network, one or more end nodes may sense or collect data which ultimately needs to be communicated to one or more application servers for use of that data. In some cases, the end nodes may be located within communication range (e.g., radio transmission range) of one or more fixed gateways with a generally persistent connection to a backhaul network of the LPWAN. Thus, those nearby end nodes may transmit their collected data to the one or more fixed gateways, which may then relay the data to upstream components of the LPWAN, such as a radio controller and the one or more application servers. Yet, some end nodes may be located remotely from any fixed gateways. To gather the data from those remote end nodes and communicate the data to the upstream components of the LPWAN, a mobile gateway may be leveraged.

One way that a mobile gateway may be used to effectuate communication with those remote end nodes is for the mobile gateway to move or be moved to within communication range of a remote end node. For example, the mobile gateway may be attached to or incorporated with a ground vehicle or an aerial vehicle. Once within communication range of the end node, the mobile gateway may transmit a beacon message to the end node to indicate that the mobile gateway is within communication range of the end node. Responsive to receiving the beacon message, the end node may transmit its collected data, or portion thereof, to the mobile gateway. As another example for effectuating transmittal of an end node's collected data to the mobile gateway, the end node may unilaterally transmit the collected data at pseudo-random time periods.

If the mobile gateway is within communication range of the end node, the mobile gateway may receive the transmitted data from the end node. In either case, the mobile gateway may in turn transmit an acknowledgement (e.g., a MAC layer acknowledgement) to the end node to indicate that the data was successfully received by the mobile gateway. When the data exchange is complete, the mobile gateway may move to a position at which it may connect to the backhaul network of the LPWAN. This may involve moving within communication range of a cellular base station or Wi-Fi access point comprising part of the backhaul network, for example. The mobile gateway may transmit, via the backhaul network, the data from the end node to a radio controller of the LPWAN. The radio controller may then transmit the data to one or more application servers for processing and use thereby. For example, the application server may present the processed data in a webpage. The application server may initiate an application layer acknowledgement indicating that the data was received by the application server. This application layer acknowledgement may be transmitted back to the mobile gateway via the radio controller and/or other intermediaries. In turn the mobile gateway may transmit the application layer acknowledgement to the end node when the mobile gateway is next in communication with the end node.

FIG. 1 illustrates various aspects of an exemplary system 100 in which the present methods and systems may operate. One skilled in the art will appreciate that provided herein is a functional description and that the respective functions may be performed by software, hardware, or a combination of software and hardware. The system 100 generally describes a low power wide area network (LPWAN) in which one or more end nodes 110a-e communicate with one or more application servers 108a-b via a radio controller 106 and a mobile data-handling device (e.g., a mobile gateway 102) and/or fixed data-handling devices (e.g., fixed gateways 104a-b). For example, an LPWAN network may be implemented according to the LoRaWAN™ specification.

The end nodes 110a-e (which will be referred to in non-specific contexts as end node 110) collect and exchange data according to various functions. For example, an end node 110 may be located in a field of crops to monitor and report the amount of rainfall occurring in the field over a period of time. As another example, an end node 110 may be embedded in a street-corner garbage receptacle to monitor and report the level of garbage in the receptacle. As yet another example, an end node 110 may be incorporated into a tracking collar attached to a wild animal for purposes of tracking the animal or monitoring some biological aspect of the animal, such as its temperature or heart rate. Uses of an end node 110 are not limited to collecting and transmitting data, but may also include performing some useful operation or action. For example, an end node 110 may be incorporated in a lighting device and, upon receipt of a command, may turn the lighting device on or off. As is clear from the above examples, the end nodes 110 may be used in a wide variety of contexts, including building and home automation, transportation, agriculture, retail, industry, supply chain management, manufacturing, healthcare, public utilities, and scientific research.

To facilitate such functions, the end nodes 110 each may be embodied as a computing device. As such, the end nodes 110 may each comprise a processor and a memory. The memory may store instructions that, when executed by the processor, effectuate various operations described herein. The memory may additionally store data collected by the end nodes 110 which is later transmitted to other components of the system 100. The end nodes 110 each may further comprise a sensor to gather any of various forms of data depending upon the particular application of the end node 110. As some examples according to the above-described exemplary functions of the end nodes 110, the sensor may comprise a rain or moisture sensor, a level sensor, a location sensor (e.g., a GPS sensor), or a biometric sensor. The end node 110 additionally may comprise an actuator to implement some action, such as turning on the aforementioned lighting device.

The end node 110 may be further configured with a communication interface, such as a radio transceiver, to transmit and receive data. For example, the communication interface may be configured to wirelessly communicate with the mobile gateway 102 and/or the fixed gateways 104a-b. A power source, such as a battery or a solar cell, may provide power to the end node 110. It will be appreciated that the end node 110 may be integrated with or incorporated into another device or object and, as such, may share some or all components with that device or object.

As indicated, the system 100 may comprise a radio controller 106. The radio controller 106 may be embodied as one or more interconnected computing devices, such as servers and/or networking devices. As will be discussed further herein, the radio controller 106 may serve to facilitate and coordinate communication between the end nodes 110 and the application servers 108a-c. For example, the interaction between the gateways (e.g., the mobile gateway 102 and/or the fixed gateways 104) and the end nodes 110 may be coordinated by the radio controller 106. As such, the radio controller 106 may provide intelligence relating to data packets transmitted between the end nodes 110 and the gateways, including, as some examples, scheduling acknowledgments, performing security and data integrity functions, and managing data transmission rates between the end nodes 110 and gateways.

The system 100 may further comprise one or more application servers 108*a-c* (which will be referred to in non-specific contexts as application servers 108). The application servers 108 each may be embodied as one or more interconnected computing devices, such as servers or networking devices. The application servers 108 may receive and/or collect data from the end nodes 110. The application servers 108 may interact with the end nodes 110 (via the radio controller 106 and the fixed gateways 104 and/or mobile gateways 102) and perform a function relating to that interaction with the end nodes 110. As will be appreciated due to the wide variety of potential types and functions of the end nodes 110, the operations performed by the application servers 108 are equally broad. As one example, the application servers 108 may receive data collected by the end nodes 110, process that data, store that data, and/or transmit or present the processed date in some form. For instance, if the aforementioned exemplary end node 110 is configured to be attached to a wild animal and collect movement positions of that animal, the applications servers 108 may receive data representing those movement positions, analyze that data, and provide a webpage showing the movement positions overlaid on a map. As another example, if the end node 110 is configured to record a home gas meter's reading, the applications servers 108 may receive and process those readings and then email an electronic billing statement to the home's resident.

The system 100 may further comprise data-handling devices, such as gateways, that, may facilitate communication between the end nodes 110 and upstream components, such as the radio controller 106 and application servers 108. For example, the system 100 may comprise one or more mobile gateways 102 and one or more fixed gateways 104*a-b* (which will be referred to in non-specific contexts as fixed gateways 104). As the name implies, the mobile gateway 102 may be movable. For example, the mobile gateway 102 may be mounted on a ground vehicle or an aerial vehicle, such as an unmanned aerial vehicle (UAV). In contrast, the fixed gateways 104 may be stationary and may not move.

As used herein, "upstream" generally refers to the data flow direction starting at the end nodes 110 and leading to the application servers 108 (i.e., left to right in FIG. 1). Depending on context, an "upstream" descriptive modifier may also refer to the components of the system 100 that correspond to this upstream direction of data flow. That is, the application servers 108 are upstream of the radio controller 106, the radio controller 106 is upstream of the gateways 102, 104, and the gateways 102, 104 are upstream of the end nodes 110. Conversely, "downstream" refers to the dataflow direction (or a corresponding descriptive modifier of a component), starting at the applications servers 108 and leading to the end nodes 110 (i.e., right to left in FIG. 1).

The data-handling devices (e.g., the gateway 102 and the fixed gateways 104) may each be embodied as computing devices. Accordingly, the mobile gateway 102 and the fixed gateways 104 may each be configured with a processor and memory. The memory may store instructions that, when executed by the processor, effectuate various operations described herein. The memory may additionally store data received from the end nodes 110 and/or the radio controller 106. The mobile gateways 102 and fixed gateways 104 each may further comprise one or more communication interfaces, such as a radio transceiver to communication wirelessly via radio frequency with one or more end nodes 110 and/or to communicate with the radio controller 106. The communication interface may additionally comprise an interface for communicating over a wired network, such as an Ethernet or fiber-optic interface. Such an interface may be used to communicate with the radio controller 106, for example.

The mobile gateway 102 and fixed gateways 104 may communicate with the radio controller 106 over a backhaul network 112. The backhaul network 112 may be configured as a local area network (LAN), a wide area network (WAN), the Internet, and the like. Further, the backhaul network 112 may comprise a wireless and/or a wired network. As an example of a wireless network, the backhaul network 112 may comprise a cellular network, such as a 3G (third generation) or LTE (Long Term Evolution) cellular network. As other examples, the backhaul network 112 may comprise a satellite network or a Wi-Fi network. As examples of a wired network, the backhaul network 112 may comprise an Ethernet network, a coaxial cable network, or a fiber optic network.

Since the mobile gateway 102 may be movable, the mobile gateway's 102 connection to the radio controller 106 via the backhaul network 112 may be intermittent (as indicated by the dashed line connecting the mobile gateway 102 and the radio controller 106 in FIG. 1). For example, the mobile gateway 102 may move out of the range of a radio transceiver (e.g., a cellular network base station) of the backhaul network 112 and thus, at least temporarily, fall out of communication with the backhaul network 112. When the mobile gateway 102 moves back into range of the radio transceiver, the mobile gateway 102 may re-establish communication with the backhaul network 112 and thereby exchange data with the radio controller 106 and/or application servers 108. As another example, the mobile gateway 102 may connect to the backhaul network 112 via a wired connection. When the mobile gateway 102 is moved, such as to connect with and exchange data with one or more end nodes 110, the wired connection of the mobile gateway 102 to the backhaul network 112 may be disconnected. The wired connection of the mobile gateway 102 to the backhaul network 112 may be later reconnected. For instance, the wired connection may be reconnected after the mobile gateway 102 has exchanged data with one or more end nodes 110 and returned to a home base with said wired connection.

Connection to the backhaul network 112 may be effectuated via a computer and/or network device (i.e., a data-receiving device, not shown in FIG. 1). For example, the device via which the mobile gateway 102 and/or the fixed gateways 104 may wirelessly connect to the backhaul network 112 may comprise a station. A station may comprise a wireless access point, such as that used with a Wi-Fi network or other wireless networks using the IEEE 802.11 standard, or other type of wireless network. A station may comprise a cellular base station, such as that used to connect cellular telephones or other cellular-equipped devices to a cellular network. Additionally or alternatively, the device via which the mobile gateway 102 and/or the fixed gateways 104 may connect to the backhaul network 112 may comprise a wired network interface, such as an Ethernet interface.

As already noted, the mobile gateway 102 and fixed gateways 104 may facilitate communication between one of more of the end nodes 110 and the radio controller 106. A given end node 110 may be in range of—and therefore communicative with—one or more (or none, in some instances) gateways. For example, as illustrated in FIG. 1, the end node 110*e* is in communication with the fixed gateway 104*b*, the end node 110*d* is in communication with the fixed gateway 104*b* and the fixed gateway 104*a*, the end node 110c is in communication with the fixed gateway 104a, and the end node 110b is in communication with the fixed gateway 104a. Further, because the mobile gateway 102 is mobile and not at a fixed location, the end node 110b may be only in intermittent communication with the mobile gateway 102 (as indicated by the dashed line connecting the two in FIG. 1). Finally, the end node 110a may be only in intermittent communication with the mobile gateway 102 (as also indicated by the dashed connecting line in FIG. 1).

The end nodes 110 and the gateways (e.g., the mobile gateway 102 and/or the fixed gateways 104) may communicate using one or more modulations techniques. For example, the end nodes 110 and gateways may communicate using frequency-shift keying (FSK) modulation. As another example, the end nodes 110 and the gateways may communicate using a spread spectrum modulation technique, such as chirp spread spectrum modulation. Further, an adaptive data rate (ADR) scheme may be employed in the communication between the end nodes 110 and the gateways. For example, the data rate used in a particular communication between one of the end nodes 110 and one of the gateways may be a function of the duration of the communication required and the signal strength between the end node 110 and the gateway.

The fixed gateways 104 may facilitate communication between the end nodes 110 (e.g., the end nodes 110b, 110c, 110d, and/or 110e) and the application servers 108 as follows. An end node 110 may initiate an uplink communication with one or more fixed gateways 104. The uplink communication may be event driven, such as if the end node 110 sensed a particular event or received a particular input, or may be according to a schedule determined by the end node 110. The schedule may comprise a random component. For example, the schedule may indicate that the uplink communication is to be sent at a pre-determined time plus a small randomly-determined time offset. To initiate uplink communication with one or more fixed gateways 104, the end node 110 may send a uplink message packet to one or more fixed gateways 104. The uplink message packet may comprise a payload, which may comprise the data intended to be transmitted to one or more application servers 108. The uplink message packet may further comprise a preamble and/or header, which may comprise metadata describing various aspects of the uplink message packet and/or the payload.

After the one or more end nodes 110 transmit an uplink message packet, each end node 110 may open one or more successive receive windows during which a downlink message packet may be received by the end node 110. For example, a first receive window may be a one second time interval from the time that the uplink message packet was transmitted and a second receive window may be a two second time interval starting from the end of the first receive window.

The one or more fixed gateways 104 may receive the uplink message packet and relay the uplink message packet over the backhaul network 112 to the radio controller 106. The radio controller 106 may receive the uplink message packets and perform various operations to coordinate and process the uplink message packets. For example, the radio controller 106 may determine if redundant uplink message packets were received (since more than one fixed gateway 104 may receive and relay the uplink message packet). As another example, the radio controller 106 may verify the integrity and security of the payload, such as via a CRC (cyclic redundancy check) code included in the uplink message packet. In addition, the radio controller 106 may schedule an acknowledgement to be sent back to the end node 110. The acknowledgement may be a MAC layer acknowledgement. As such, the radio controller 106 may select one of the fixed gateways 104 (or mobile gateway 102, as described in greater detail herein) that relayed the uplink message packet to thereby relay a downlink message packet to the end node in response to the uplink message packet. Thus, while the uplink message packet may be relayed by multiple gateways, the downlink message packet may instead be relayed to the end node 110 by only a single gateway.

Similar to the uplink message packet, the downlink message packet may comprise a preamble, a header, and a payload. The payload may contain data intended to be delivered to the end node 110. The header may describe various aspects of the downlink message packet and/or the payload. The downlink message packet may further comprise an acknowledgement to a previously received uplink message packet. The acknowledgement may be a MAC layer acknowledgement, which may indicate that the uplink message packet from the end node 110 was successfully received by the gateway 104 and/or the radio controller 106. The acknowledgement (and/or another coterminous acknowledgement) may be an application layer acknowledgement, which may indicate that an uplink message packet, or portion thereof, was successfully received by one or more of the application servers 108. For example, the application layer acknowledgement may be with respect to a previous uplink message packet from the end node 110, including an immediately previous uplink message packet from the end node. It will be noted that the downlink message packet may comprise an acknowledgement without a payload. That is, the downlink message packet may serve as an acknowledgement to an uplink message packet without including any substantive data.

With the uplink message packet having been received by the radio controller 106, the radio controller 106 may transmit the uplink message packet and/or the data contained in the payload of the uplink message packet to one or more application servers 108. The application servers 108 may use the data for various purposes according to the particular function being implemented.

If appropriate for the particular function implemented by the end nodes 110 and application servers 108 (e.g., the function requires bi-directional communication between the end nodes 110 and the application servers 108), the application servers 108 may transmit data to the radio controller 106 for ultimate delivery to one or more of the end nodes 110. The data may be in the form of a downlink message packet or other form. As already noted, the downlink message packet from the application server 108 may comprise an application layer acknowledgement indicating that the application server 108 successfully received the uplink message packet, or portions thereof, from the end node 110. The radio controller 106 may receive the data and, if necessary, format it as a downlink message packet including the data as a payload. The radio controller 106 may hold the downlink message packet until an uplink message packet is received from the destination end node 110, which indicates that the end node 110 has opened one or more receive windows.

The downlink message packet need not be held by the radio controller 106 and instead may be transmitted downstream upon receipt by the radio controller 106. As another example, a periodic beacon may be transmitted by the fixed gateways 104 and received by the end node 110. The periodic beacon may indicate if a downlink message packet is being held by the radio controller 106. Based on the periodic beacon, the end node 110 may extend its receive window and listen for the downlink message packet sent from the radio controller 106 via the fixed gateways 104.

The radio controller 106 may select one of the fixed gateways 104 (or mobile gateways 102, as described in greater detail herein) and transmit the downlink message packet to the selected fixed gateway 104 with instructions for the fixed gateway 104 to further transmit the downlink message packet to the destination end node 110. The selection of the fixed gateway 104 may be based on the downlink capacity of the fixed gateways 104, for example. The fixed gateway 104 may receive the downlink message packet and transmit it to the end node 110, preferably within one of the end node's 110 receive windows.

Figure 2:
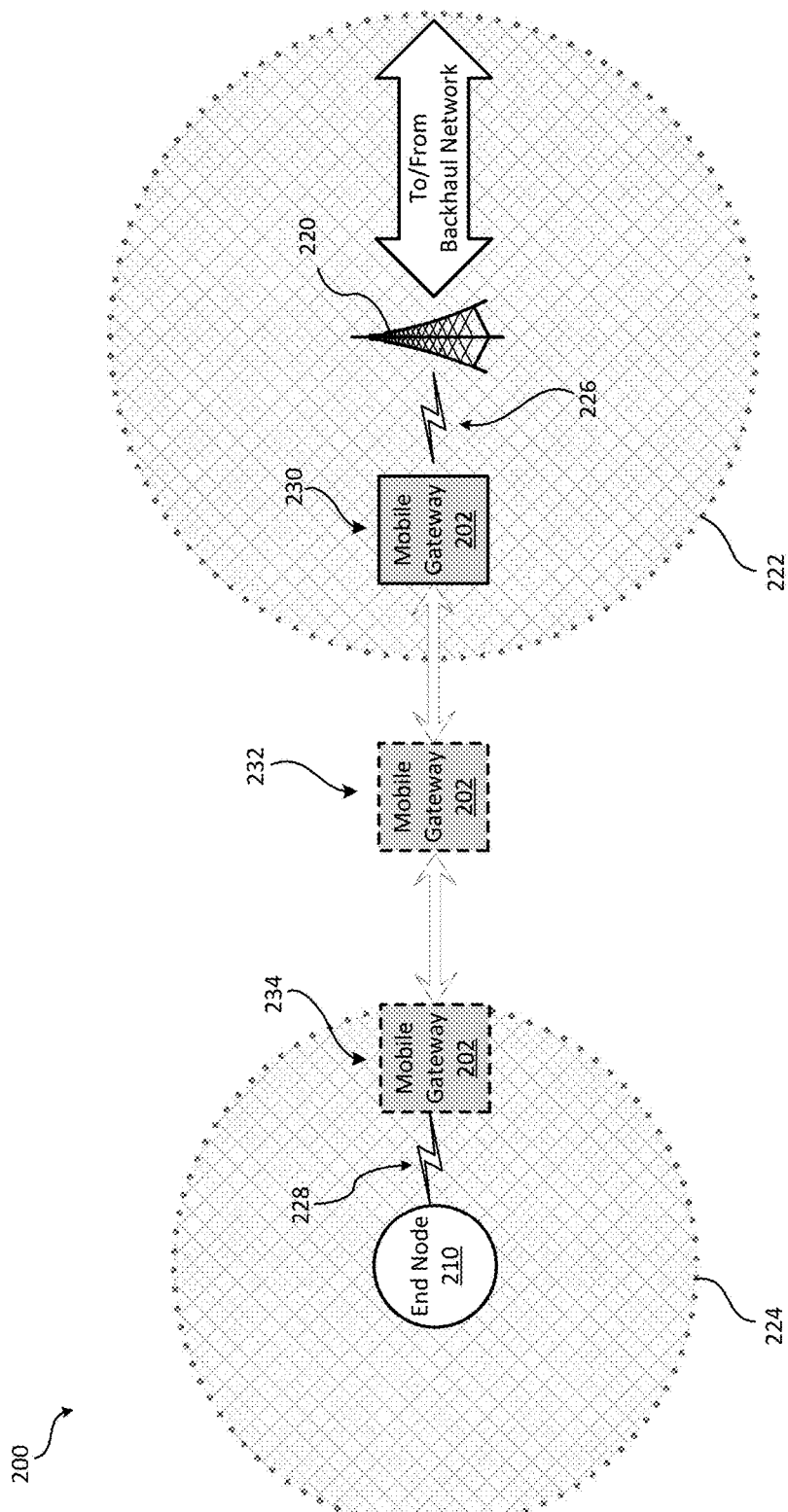
FIG. 2 illustrates a block diagram of an example system according to an embodiment of the present disclosure.

FIG. 2 shows an exemplary system 200 at least partially representing a portion of the system 100 of FIG. 1. The system 200 may demonstrate an arrangement in which a mobile gateway may move to enable communications between an end node and a back haul network. Here, a station 220 (representative of any data-receiving device) may effectuate communication via a backhaul network (e.g., the backhaul network 112 of FIG. 1). In particular, the station 220 may enable communications of the gateways 102, 104 of FIG. 1 over the backhaul network. The station 220 may be a component of the backhaul network or may be a separate intermediary to the backhaul network. The station 220 may comprise a wireless base station, such as a wireless access point. A wireless access point may communicate via Wi-Fi or other IEEE 802.11 standard. The station 220 may comprise a cellular network base station for communication via a cellular protocol, such as that used in a wireless telephony network to service communications between mobile phones and the like. Although not expressly depicted in FIG. 2, the station 220 or the like may comprise a device having a wired network interface, such as an Ethernet interface.

The system 200 may comprise a representative end node 210, which may be similar in some aspects to the end nodes 110 of FIG. 1. The station 220 may have a communication range of 222 within which the station 220 may wirelessly communicate with other devices. The end node 210 also may have a communication range 224 within with the end node 210 may wirelessly communicate with other devices. It is noted that the communication ranges 222 and 224 may not be to scale in the representations in FIG. 2. The system 200 may comprise a mobile gateway 202, which may be similar in some aspects with the mobile gateway 102 of FIG. 1. The mobile gateway 202 is shown at several positions as the mobile gateway 202 may move over time. Such movement is indicated by bidirectional arrows in FIG. 2.

At one position 230, the mobile gateway 202 is within the communication range 222 of the station 220. For clarity of illustration, the communication range of the mobile gateway 202 is not shown. It is assumed, again only for the purpose of illustration, that the mobile gateway 202 has sufficient communication range to reciprocate communication with the station 220 and the end node 210, as the case may be. At the position 230, the mobile gateway 202 may communicate, via a wireless communication channel 226, with the station 220. By virtue of the communication with the station 220, the mobile gateway 202 further may communicate over the backhaul network and other upstream components, such as a radio controller (e.g., the radio controller 106 of FIG. 1) and application servers (e.g., the application servers 108 of FIG. 1). At the position 230, the mobile gateway 202 may transmit any uplink message packets received from the end node 210 and/or receive any downlink message packets from the controller and/or the application servers. The uplink message packets may comprise data collected by the end node 210, for example. The downlink message packet may comprise data from one or more application servers 108, MAC layer acknowledgements, and/or application layer acknowledgements derived from the one or more application servers. 108

The mobile gateway 202 may move to a position 232, which is out of communication range of both the station 220 and the end node 210. Thus, the mobile gateway 202 may not communicate with either of the two. The position 232 may be along a direct route to the communication range 224 of the end node 210. Or the position 232 may be located along an indirect route, such as a route along which the mobile gateway 202 communicates with other end nodes. If the mobile gateway 202 has uplink message packets, for example, the mobile gateway may move back to the position 230 to enable communication with the station 220 and relay the uplink message packets and/or receive downlink message packets. Even if the mobile gateway 202 does not have uplink message packets to relay, it may still be advantageous for the mobile gateway 202 to move to the position 230 and communicate with the station 220 to potentially receive any downlink message packets to relay to the end node 210.

By way of the position 232 (or other position), the mobile gateway 202 may move to a position 234, which is within the communication range 224 of the end node 210. At the position 232, the mobile gateway 202 may communicate, via a wireless communication channel 228, with the end node 210, such as receiving uplink message packets from the end node 210. The uplink message packet may comprise data collected by the end node 210, for example. The mobile gateway 202 may communicate downlink message packets to the end node 210, which may comprise a MAC layer acknowledgement that is responsive to receiving an uplink message packet from the end node 210. Additionally or alternatively, the mobile gateway 202 may transmit an application layer acknowledgement to the end node 210 that indicates that the application servers received a respective uplink message packet, or portion thereof (e.g., payload data), from the end node 210, such as one that was previously transmitted by the end node 210. A downlink message packet may comprise a data payload, such as from the one or more application servers 108.

After exchanging data (e.g., uplink and downlink message packets) with the end node 210, the mobile gateway 202 may move back to the communication range 222 of the station 220. This may occur immediately or at a later time, such as if the mobile gateway 202 first moved to other end nodes to exchange data with those end nodes before moving towards the communication range 222 of the station 220. The movement back to the communication range 222 of the station 220 may be via the position 232 or other route. Whichever the case, it is contemplated that the mobile gateway 202 may move through a region that is not with the communication range 222 of the station 220. At the position 230 or otherwise within the communication range 222 of the station 220 again, the mobile gateway 202 may transmit uplink message packets that it received, such as from the end node 210 or other end nodes. The mobile gateway 202 likewise may receive downlink message packets from the station 220. The downlink message packets may comprise payload data and/or application layer acknowledgements derived from the application servers. The downlink message packets, the application layer acknowledgement particularly, may be responsive to a previous uplink message packet derived from the end node 210 or the uplink message packet from the end node 210 that was contemporaneously relayed by the mobile gateway 202 and station 220 to the application servers.

Thereafter, the mobile gateway 202 may move back, such as via the intermediate position 232, to the communication range 224 of the end node 210. The mobile gateway 202 may transmit the application layer acknowledgement, which is responsive to the end node's 210 previous uplink message packet, to the end node 210. Thus, the end node 210 may "know" that the end node's 210 previous uplink message packet was successfully received by the application servers.

The particular positioning, movements, and ordering of these movements is not intended to be limiting or indicative of a preferred embodiment. Instead, the system 200 and aspects represented by the system 200 are provided for purposes of illustration.

Figure 3A:
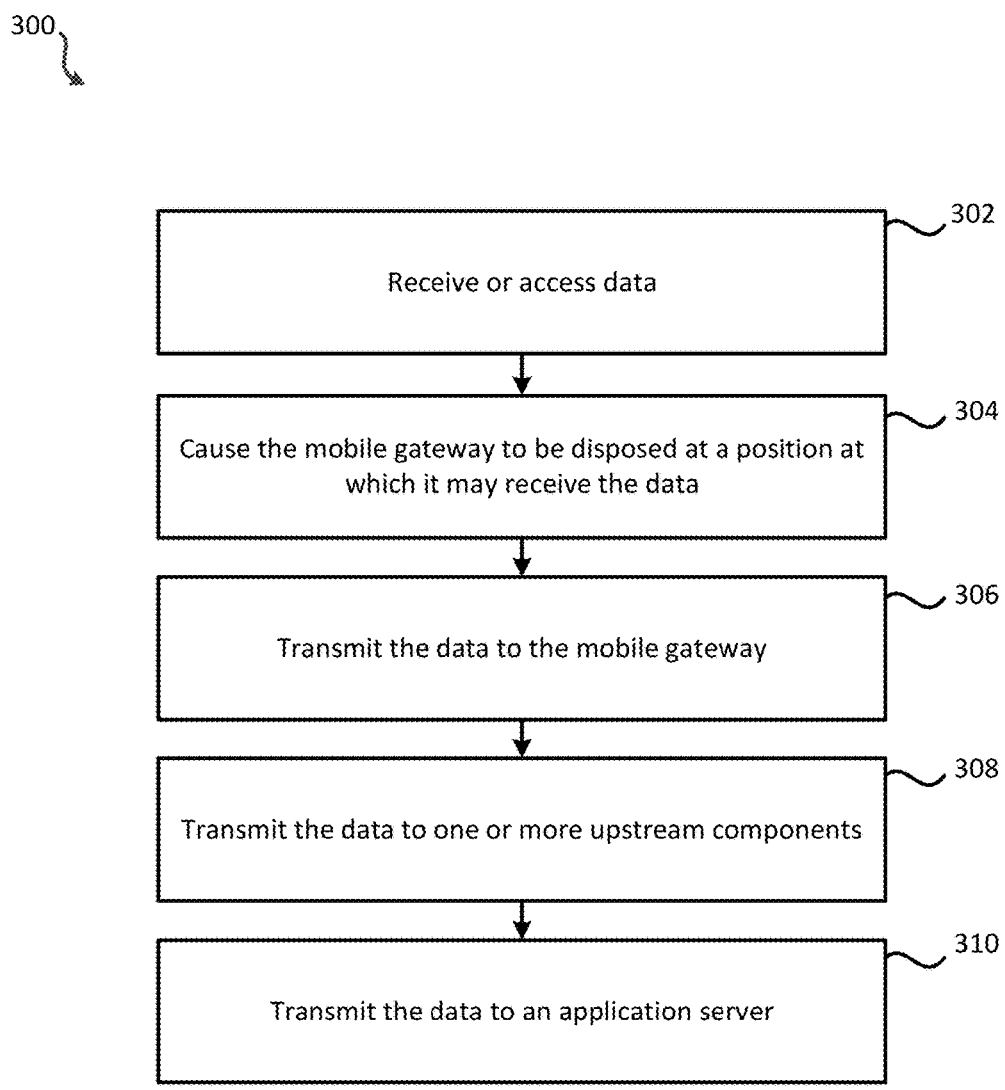
FIG. 3A illustrates a flow chart of an example method according to an embodiment of the present disclosure.

FIG. 3A illustrates an example method 300 by which data from one or more end nodes (e.g., the end nodes 110 of FIG. 1) may be transmitted via a mobile gateway (e.g., the mobile gateway 102 of FIG. 1). At step 302, data may be received or accessed. For example, one of the end nodes may receive or access data that is intended to be transmitted upstream, such as to one or more of the application servers (e.g., the application servers 108 of FIG. 1). As indicated above, the data received or accessed by the end node may comprise any of a variety of types of data, such as a gas meter reading or positions of an animal. The end node may be one (such as the end node 110a of FIG. 1) that is remotely located and not in communication range of one of the fixed gateways (e.g., the fixed gateways 104 of FIG. 1). Thus, the end node is unable to transmit the data upstream via one of the fixed gateways 104 and instead may rely on the mobile gateway for communication with upstream components.

At step 304, the mobile gateway may be disposed or be caused to be disposed at a position at which the mobile gateway may receive the data collected in step 302. For example, the mobile gateway may be initially disposed at a position at which the mobile gateway is incapable of receiving the collected data (e.g., out of communication range of the end node). The mobile gateway may be later disposed at a position at which the mobile gateway may receive the collected data (e.g., within communication range of the end node).

This may entail, for example, the mobile gateway moving within communication range of the end node. The communication range of the end node may be defined by the radio transmission range and/or power of a radio transceiver of the end node. For example, the radio transceiver of the end node may operate at maximum power in the range of 18 dBm to 28 dBm.

As the anticipated communication between the end node and the mobile gateway may be bidirectional, the position of the mobile gateway at which it may communicate with the end node may be additionally or alternatively defined by the radio transmission range and/or power of a radio transceiver of the mobile gateway. For example, the radio transceiver of the mobile gateway may operate at maximum power in the range of 18 dBm to 28 dBm.

By being within range of one another, the end node and the mobile gateway may be capable of effectuating communication with one another. For example, the end node and the mobile gateway may be capable of exchanging radio signal transmissions. As one illustrative example, the mobile gateway may be affixed to or incorporated with a vehicle, such as a car or truck, and the vehicle may be driven so that the mobile gateway is within communication range of the end node. As another illustrative example, the mobile gateway may be affixed to or incorporated with an aerial vehicle, such as a UAV, and the aerial vehicle may fly to a position such that the mobile gateway is within communication range of the end node.

At step 306, data may be transmitted to the mobile gateway, such as the data collected or otherwise received or accessed in step 302. For example, the end node may transmit the data to the mobile gateway. The data transmitted to the mobile gateway may be in the form of an uplink message packet. The uplink message packet may comprise a payload with the data collected by the end node. The uplink message packet may further comprise a preamble and/or header with metadata describing the uplink message packet and/or the payload. The mobile gateway may receive the data (e.g., the uplink message packet) and store the data for later transmission to upstream components. After transmitting the data to the mobile gateway, the end node may open one or more receive windows during which the end node 110 is operable to receive a return transmission from the mobile gateway, such as a MAC layer acknowledgement that the data was successfully received by the mobile gateway.

Responsive to receiving the data from the end node, the mobile gateway may transmit a downlink message packet to the end node. The downlink message packet may preferably be transmitted to the end node during the end node's one or more receive windows. Similar to the uplink message packet, the downlink message packet may comprise a payload with data and/or a preamble with metadata describing the downlink message packet and/or the payload. The data of the payload may comprise data from an upstream component, such as a radio controller (e.g., the radio controller 106 of FIG. 1) and/or the application servers, that was previously received by the mobile gateway and stored until in communication with the end node.

The downlink message packet may additionally or alternatively comprise one or more acknowledgments. The acknowledgement may be an application level acknowledgement or a MAC layer acknowledgement. The MAC layer acknowledgement may serve to communicate to the end node that the data (e.g., the uplink message packet) from the end node was received by the mobile gateway. The application level acknowledgement may indicate that the application server successfully received data from the end node. For example, the application layer acknowledgement may be with respect to data that the end node transmitted to the mobile gateway during a previous communication with the mobile gateway and which the mobile gateway relayed upstream to the application server. The previous communication may be a communication that occurred during a previous instance in which the mobile gateway was in reciprocal communication with the end node.

Responsive to the end node receiving the acknowledgement(s) from the mobile gateway, the end node may, for example, proceed to send an additional data transmission (e.g., another uplink message packet) to the mobile gateway. This additional data transmission may itself comprise an acknowledgement to communicate to the mobile gateway that the downlink message packet previously sent by the mobile gateway was received by the end node. Thus, further communications and/or data exchanges between the mobile gateway and the end node may be likewise performed.

When the communication and/or data exchange between the end node and the mobile gateway is complete, the mobile gateway may move or be moved to a position or location at which it may connect to the backhaul network, which may be connected to the radio controller. This may comprise moving from a position in which the mobile gateway was in communication range with the end node to another position in which the mobile gateway is no longer in communication range with the end node. This may additionally or alternatively comprise moving from a position at which the mobile gateway is not able to connect to the backhaul network to another position at which the mobile gateway is able to connect to the backhaul network.

It will be recalled that the connection to and/or communication via the backhaul network may be effectuated by a data-receiving device, such as a wireless access point, a cellular network base station, or other type of station or similar implementation. The data-receiving device may form part of the backhaul network or may be an intermediary to the backhaul network without being part of the backhaul network. For example, the mobile gateway may move within communication range of a cellular network base station of the backhaul network or otherwise associated with the backhaul network. As another example, the mobile gateway may move to a position at which a wired connection, such as an Ethernet connection, may be established between the mobile gateway and the backhaul network. FIG. 2 illustrates one example use case relating to the movements of the mobile gateway and the positional relationships of the mobile gateway, the end node, and/or the data-receiving device associated with the backhaul network, particularly with respect to affecting communications therebetween.

Thus, at step 308, the mobile gateway may transmit the data to one or more upstream components of the system. For example, the mobile gateway may connect to the backhaul network and transmit the data received from the end node to an upstream component, such as the radio controller and/or the application servers. For example, the data included in the payloads of one or more uplink message packets received by the mobile gateway from the end node may be extracted from the one or more uplink message packets and transmitted to the radio controller via the backhaul network. Additionally or alternatively, the one or more uplink message packets may be transmitted from the mobile gateway to the radio controller and the radio controller may extract the data from the payloads of the one or more uplink message packets. The one or more uplink message packets may be supplemented with metadata describing the transmission from the end node to the mobile gateway, such as a channel identifier, a modulation identifier, and/or RSSI (Received Signal Strength Indicator). Since the mobile gateway may have already provided a MAC layer acknowledgement to the end node, there may be no need at this point for the radio controller to direct the mobile gateway to transmit such an acknowledgement to the end node.

At step 310, the data may be transmitted to one or more application servers. For example, the radio controller may transmit the data from the end node to one or more application servers. The one or more application servers may receive the data and perform various operations relating to the data according to the particular function implemented by the one or more applications servers. For example, if the data from the end node comprises a home gas meter reading, the one or more application servers may process the gas meter reading and generate an electronic billing statement based on the processed gas meter reading. The one or more application servers may transmit the electronic billing statement to the home resident via email or may generate and serve a webpage with the electronic billing statement.

Figure 3B:
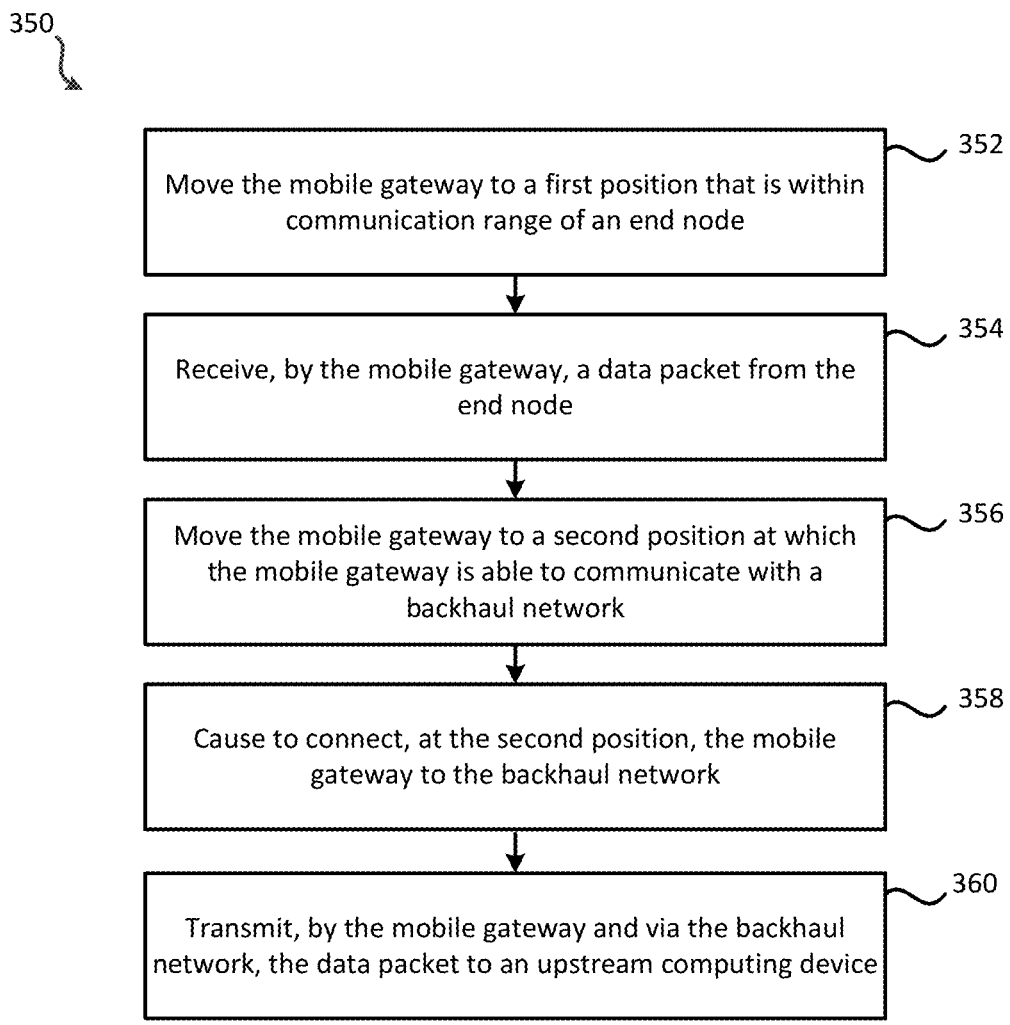
FIG. 3B illustrates a flow chart of an example method according to an embodiment of the present disclosure.

FIG. 3B illustrates an example method 350 by which data from one or more end nodes (e.g., the end nodes 110 of FIG. 1) may be transmitted via a mobile gateway (e.g., the mobile gateway 102 of FIG. 1). At step 352, the mobile gateway may move or be caused to move to a first position. The first position may be within communicate range of the end node. For example, the mobile gateway may be disposed at a position that is outside of the communication range of the end node and move or be caused to move to the first position that is within communication range of the end node. The first position may be a position at which the mobile gateway is not in communication with and/or not in communication range of a backhaul network (e.g., the backhaul network 112 of FIG. 1) or other upstream components.

The communication range of the end node may be defined by a radio transmission range of a radio transceiver of the end node. The communication range between the mobile gateway and the end node may be additionally or alternatively defined by a radio transmission range of a radio transceiver of the mobile gateway.

At step 354, the mobile gateway may receive a data packet from the end node. The data packet may comprise data that was collected or otherwise received or accessed by the end node. For example, the data packet may comprise rain or soil nutrient data collected from an end node disposed in a lawn. As another example, the data packet may comprise data representing gas usage that is collected by an end node operating in connection with a gas meter at the residence. The data packet received from the end node may comprise an uplink message packet, as described in greater detail herein.

Responsive to receiving the data packet from the end node, the mobile gateway may transmit a MAC layer acknowledgement back to the end node. The MAC layer acknowledgement may serve to notify the end node that the data packet was successfully received by the mobile gateway. The MAC layer acknowledgment may be part of a downlink message packet, as described in greater detail herein. Additionally or alternatively, the mobile gateway may transmit an application layer acknowledgement to the end node. The application layer acknowledgement may indicate that the application servers received data previously transmitted from the end node.

At step 356, the mobile gateway may move or be caused to move to a second position (e.g., different from the first position) at which the mobile gateway is able to communicate with the backhaul network. For example, the mobile gateway may be disposed at another position and move or be caused to move to the second position. The another position may be a position at which the mobile gateway is not able to communicate with the backhaul network. As an example, the mobile gateway may move or be caused to move to the second position at which the mobile gateway is within communication range with respect to radio transceiver(s) of the mobile gateway and/or the backhaul network (e.g., the data-receiving device, such as the station 220 of FIG. 2). The second position may be a position at which the mobile gateway is not within communication range of the end node from which it received a data packet.

The backhaul network may comprise a cellular network. Thus, the second position may be a position within communication range of a cellular base station of the cellular network or associated with the cellular network. As another example, the backhaul network may comprise a Wi-Fi network. Thus, the second position may be a position within communication range of a Wi-Fi access point, which may be part of the backhaul network or may be associated with the backhaul network. The backhaul network may comprise a wired network, such as an Ethernet network. Accordingly, the second position may be a position at which the mobile gateway may establish a wired connection with the backhaul network (e.g., "plug into" the wired network).

At step 358, the mobile gateway may be caused to connect to the backhaul network. For example, the mobile gateway may connect to the backhaul network via the data-receiving device (e.g., a wireless access point or cellular network base station). The mobile gateway may connect or be caused to connect to the backhaul network while the mobile gateway is at the second position. The mobile gateway may connect or be caused to connect to the backhaul network according to one or more of the aforementioned communication interfaces to the backhaul network. The mobile gateway may connect to the backhaul network while the mobile network is in communication range of the backhaul network, whether disposed at the second position or not.

At step 360, the mobile gateway may transmit the data packet to an upstream computing device via the backhaul network. The mobile gateway may transmit the data packet to an upstream computing device by virtue of the connection established with the backhaul network in step 358. The upstream computing device may comprise the radio controller and/or one or more of the application servers.

Figure 4:
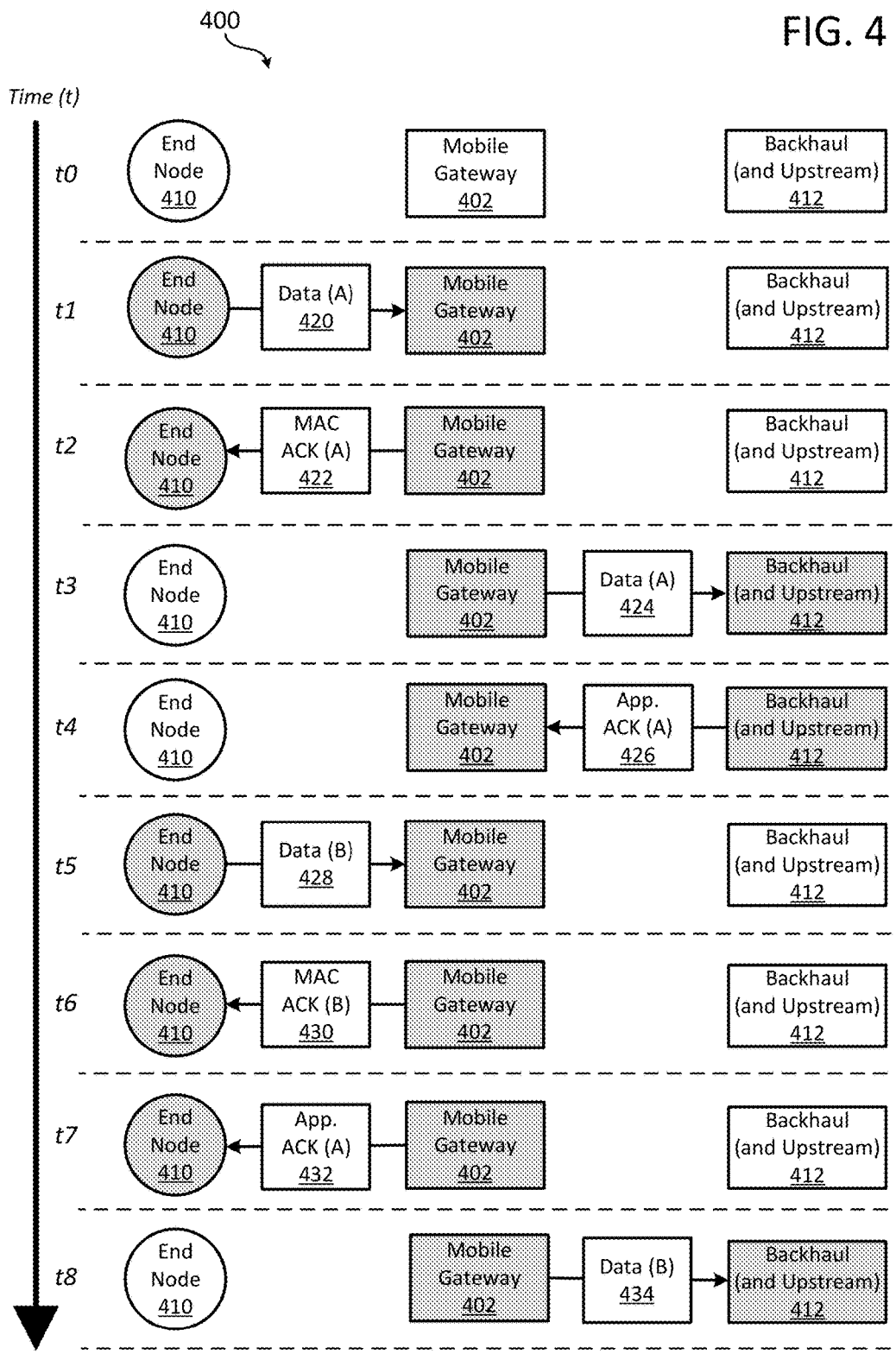
FIG. 4 illustrates a temporal data flow diagram according to an embodiment of the present disclosure.

FIG. 4 illustrates a temporal data flow diagram 400 progressing according to a Time (t), indicated by the downward pointing arrow to the left of the figure. Specifically, the data flow diagram 400 illustrates an example sequential flow of various types of data between an end node 410, a mobile gateway 402, and a backhaul network 412, as well as those components upstream from the backhaul network 412, including a radio controller (not shown) and an application server (not shown). The end node 410, the mobile gateway 402, the backhaul network 412, the radio controller, and the application server each may be similar in some aspects to the end node 110, the mobile gateway 102, the backhaul network 112, the radio controller 106, and the application server 108 of FIG. 1, respectively.

Each row of the data flow diagram 400 represents the relative positions of the components and corresponding data exchanges during a period of time, indicated by times t0-t8. It will be recalled that the mobile gateway 402 may move to a position in which the mobile gateway 402 and the end node 410 are within the respective communication ranges of one another, thereby allowing communications therebetween. Similarly, the mobile gateway 402 may move to another position in which the mobile gateway 402 may connect to the backhaul network 412 and communicate, via the backhaul network 412, with upstream components, such as the radio controller and the application server. For example and as illustrated in FIG. 2, the mobile gateway 402 may move to a position in which the mobile gateway 402 and a station (e.g., the station 220 of FIG. 2) or other data-receiving device may communicate with one another. The station may enable communication over the backhaul network 412. The station may be a component of the backhaul network 412 or may enable connection to and communication via the backhaul network while not being a component of the backhaul network 412 itself. It will be understood that the representations of the backhaul network 412 in FIG. 2 and associated data exchanges may (but not necessarily) refer to this station and associated data exchanges involving the station.

The components that are in communication with one another (e.g., within communication range of one another) are indicated by the darkened colorations of those components in the data flow diagram 400. The shifts to and from the darkened colorations may be indicative of the mobile gateway 402 moving into and out of communication range of that component.

Beginning at time t0, the mobile gateway 402 is in communication with neither the end node 410 nor the backhaul network 412. For the purposes of this example, the end node 410 is unable to independently connect to the backhaul network 412, nor are there other gateways that may enable such a connection.

At time t1, the mobile gateway 402 and the end node 410 are in communication with one another, as indicated by the darkened colorations of the representations in the data flow diagram 400. For example, the mobile gateway 402 may move into sufficient proximity to the end node 410 to cause overlap of their respective communication ranges. The end node 410 may thereby transmit data (A) 420 to the mobile gateway 402. For example, the data (A) may be transmitted as part of an uplink message packet, particularly as the payload, or portion thereof, of the uplink message packet. The data (A) 420 may comprise data collected by the end node 410.

At time t2, the mobile gateway 402 is still in communication with the end node 410. The mobile gateway 402 may have received the data (A) 420 from the end node 410. Subsequently, the mobile gateway 402 may transmit a MAC layer acknowledgement (A) 422 to the end node 410 to indicate that the mobile gateway 402 successfully received the data (A) 420 from the end node 410. The designation of (A) may indicate that the communication designated as such are associated with the data (A) 420. As will be described below, a similar designation of (B) will be used in association with the data (B) 428.

At time t3, the mobile gateway 402 is in communication with the backhaul network 412 (and also the radio controller and application server via that connection). For example, the mobile gateway 402 may have moved to a position in which the station or other data-receiving device associated with the backhaul network 412 and the mobile gateway 402 are in communication range of one another. It will be recalled that the communication between the backhaul network 412 and the mobile gateway 402 is not limited to wireless communication but also may comprise wired communication. The mobile gateway 402 may transmit the data (A) 424 (the same as or derived from the data (A) 420 received from the end node 410) to the backhaul network 412 and upstream components. For example, the data (A) 424 may be transmitted to the application server via the backhaul network and/or radio controller. The application server may thereby receive the data (A) 424.

At time t4, the mobile gateway 402, still in communication with the backhaul network 412, may receive an application layer acknowledgement (A) 426 via the backhaul network 412. For example, the application layer acknowledgement (A) 426 may have been initially generated by the application server in response to the application server receiving the data (A) 424. The application layer acknowledgement (A) 426 may indicate that the application server successfully received the data (A) 424.

At time t5, the mobile gateway 402 is again in communication with the end node 410. For example, the mobile gateway 402 may have moved to a position with sufficient proximity to the end node 410 to enable such communication. Now in communication with the end node 410, the end node 410 may transmit data (B) 428 to the mobile gateway 402. The data (B) 428 may comprise data collected by the end node 410, such as that collected by end node 410 during the time since the last data exchange with the mobile gateway 402. The data (B) 428 may be communicated as part of an uplink message packet, such as the payload, or portion thereof, of the uplink message packet.

At time t6, the mobile gateway 402 may transmit a MAC layer acknowledgement (B) 430 in response to receiving the data (B) 428 from the end node 410. The MAC layer acknowledgement (B) 430 may indicate that the mobile gateway 402 successfully received the data (B) 428.

At time t7, the mobile gateway 402 may transmit the application layer acknowledgement (A) 432 to the end node 410. The application layer acknowledgement (A) 432 was previously received by the mobile gateway 402 from the application server via the backhaul network 412. The application layer acknowledgement (A) 432 may indicate that the data (A) that was initially transmitted by the end node 410 at time t1 was successfully received by the application server. It will be noted that these actions associated with time t7 may have been performed before the actions associated with one or both of times t5 and t6.

At time t8, the mobile gateway 402 is in communication with the backhaul network 412. The mobile gateway 402 may transmit the data (B) 434 to upstream components via the backhaul network 412. The process illustrated in the data flow diagram 400 or variants thereof may be performed over subsequent iterations, as needed.

Figure 5:
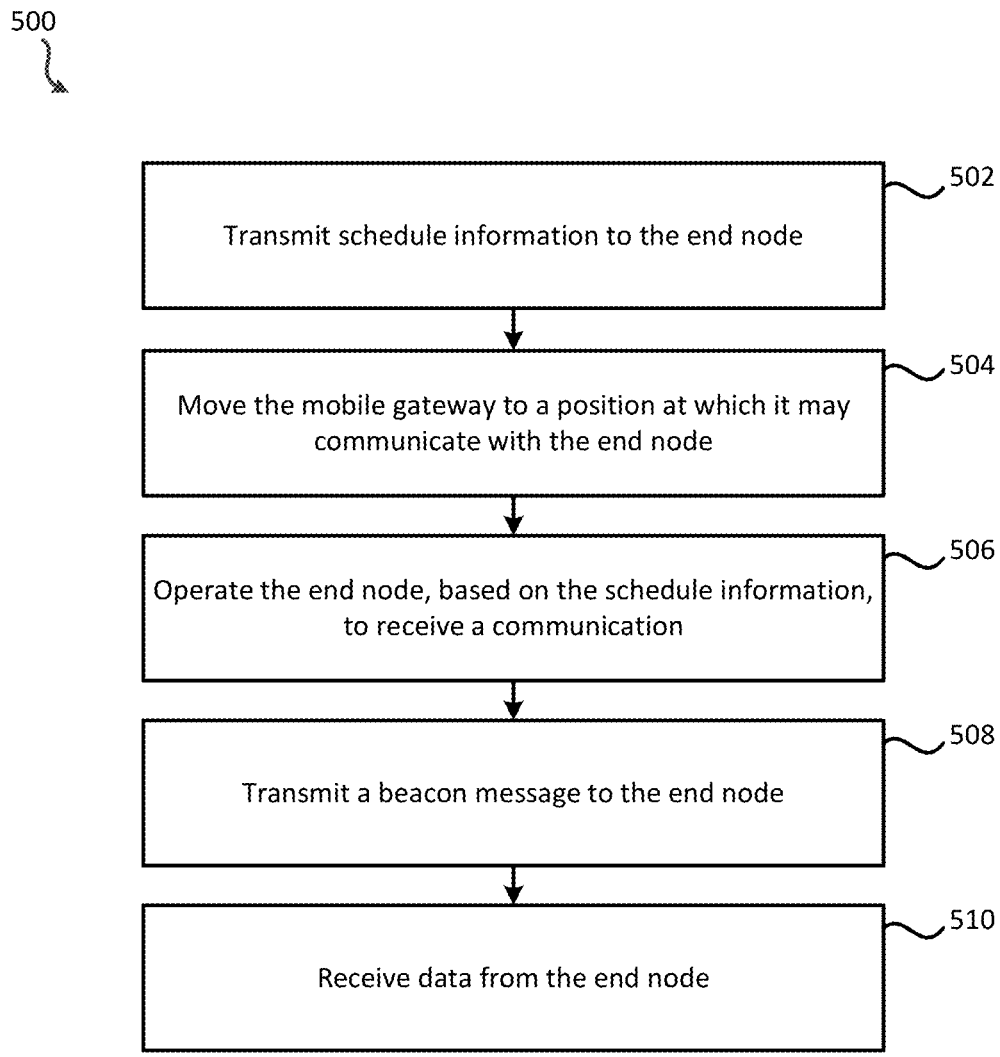
FIG. 5 illustrates a flow chart of an example method according to an embodiment of the present disclosure.

FIG. 5 illustrates an example method 500 by which communication between an end node (e.g. the end nodes 110 of FIG. 1) and a mobile gateway (e.g., the mobile gateway 102 of FIG. 1) may be effectuated. At step 502, schedule information may be transmitted to the end node (e.g., the end node 110a of FIG. 1), which may be remotely located and not within range of any fixed gateways (e.g., the fixed gateway 104 of FIG. 1). For example, the schedule information may be transmitted to the end node by the mobile gateway. The end node may thus receive the schedule information from the mobile gateway. The schedule information may be transmitted from the mobile gateway to the end node during a communication therebetween that occurred previous to the present communication. In some cases, the schedule information may be received by the end node from a source other than the mobile gateway. For example, the end node may be pre-programmed with the schedule information before the end node is deployed to its present location. As another example, the end node may receive the schedule information via one or more of the fixed gateways before being deployed and while still within communication range of the one or more fixed gateways.

The schedule information may represent a schedule according to which the mobile gateway expects to be in communication range of the end node and, thus, able to receive data from the end node. For example, the schedule information may represent one or more times at which it is expected that the mobile gateway will be driven or flown in sufficient proximity to the end node. The times included in the schedule information and at which the mobile gateway is expected to be in communication range of the end node may be weighted according to a likelihood that the mobile gateway will be within communication range. For example, the schedule information may indicate that the mobile gateway has a 80% chance of being within communication range of the end node at a first time point or time interval. The schedule information may further indicate that the mobile gateway has a 60% chance of being within communication range of the end node at a second time point or time interval.

At step 504, the mobile gateway may move to a position at which it may communicate with the end node. This may comprise, for example, the mobile gateway moving within communication range of the end node. For example, the mobile gateway may move to a position at which reciprocal radio communication may be effectuated between the mobile gateway and the end node.

At step 506, the end node may be operated, based on the schedule information, so as to enable the end node to receive a communication. For example, the end node may open one or more scheduled receive windows during which the end node is enabled to communicate with the mobile gateway. That is, while outside the scheduled receive window(s), the end node may operate such that it is unable to communicate with the mobile gateway. While during the scheduled receive window(s), the end node may operate such that it is enabled to communicate (e.g., receive communications) with the mobile gateway. For example, the radio transceiver of the end node may be transitioned from an "off" or "sleep" mode to an "on" or "active" mode when the scheduled receive window(s) commence.

The scheduled receive window(s) opened by the end node may be determined by the end node according to the schedule information. For example, the scheduled receive window(s) may be determined according to the weighted time intervals included in the schedule information and indicating the likelihoods of the mobile gateway being in communication range with the end node during respective time intervals. For example, if the schedule information indicates that a first time interval is associated with an 80% likelihood of the mobile gateway being in communication range and that a second time interval is associated with a 60% likelihood of the mobile gateway being in communication range, the end node may determine that the scheduled receive window opened by the end node may correspond with the first time interval since it is more likely that the mobile gateway will be in communication range at that time.

The scheduled receive window(s) opened by the end node may be determined additionally or alternatively based on other factors. As one example, the determination of the scheduled receive window(s) may be based on the amount of time since the end node last transmitted data upstream. For instance, the greater the amount of time, a sooner scheduled receive window may be tend to be determined rather than a later receive window. As another example, the end node may be configured to track the rate at which the end node collects and stores data and may be configured with a target data amount at which it is preferred that the end node transmits upstream. In other words, it may be undesirable for reasons of efficiency to transmit data to the mobile gateway before a certain amount of data is collected and accumulated. Likewise, it may be undesirable to wait too long before the data is transmitted to the mobile gateway due to limited storage space on the end node. Therefore, the determination of the scheduled receive window(s) may be based on an estimated rate at which the end node collects data and/or a pre-determined amount of data (or range thereof) at which it is desirable to transmit data to the mobile gateway.

At step 508, a beacon message may be transmitted to the end node. For example, the mobile gateway may transmit a beacon message to the end node, preferably during the scheduled receive window(s) opened by the end node and during which the end node is operable to receive such a transmission. The beacon message may serve to notify the end node that the mobile gateway is within communication range of the end node and able to receive a transmission from the end node. The end node may use the reception parameters of the beacon to determine or estimate the link quality of the communication path between the end node and the mobile gateway. The end node may use the reception parameters and/or link quality to determine the transmission parameters according to which the end node may transmit data to the mobile gateway. For example, transmission parameters may comprise the modulation and/or the power of the transmission.

At step 510, data may be received from the end node. For example, responsive to receiving the beacon message from the mobile gateway, the end node may transmit data to the mobile gateway and the mobile gateway may receive the data from the end node. The data may be the data collected by the end node and intended to be transmitted to upstream components, such as the application servers. Further, the data may be included in the payload of an uplink message packet, as described above. Responsive to receiving the data (e.g., the uplink message packet) from the end node, the mobile gateway may transmit a MAC layer acknowledgement to the end node indicating that the mobile gateway successfully received the data.

In an example implementation using spread spectrum modulation to effectuate communication between the end node and the mobile gateway, instead of transmitting the entirety of the uplink message packet at a single, constant spreading factor, the end node instead may transmit the preamble at a higher spreading factor and transmit the payload at a lower spreading factor. Since the preamble is transmitted at the higher spreading factor, that transmission has a larger range than the transmission of the payload at the lower spreading factor. If the mobile gateway receives both the preamble and the payload, the mobile gateway may send back a MAC layer acknowledgement to the end node. If the mobile gateway receives the preamble but not the payload during a pre-determined time period after receiving the preamble, the mobile gateway may instead transmit a negative MAC layer acknowledgement to the end node indicating that the mobile gateway only received the preamble and not the payload. If the preamble from the end node does not identify the particular end node (i.e., the mobile gateway does not "know" which end node sent the preamble), the mobile gateway may broadcast a message indicating that the mobile gateway did not receive the payload corresponding to the received preamble. The broadcast message may comprise timing information reflecting a time when the preamble was received. The broadcast message may comprise information requesting that end nodes receiving the broadcast message should attempt to resend the preamble and/or payload, particularly the preamble and/or payload previously attempted to be transmitted at the time reflecting in the timing information.

Responsive to receipt of the negative acknowledgement (or broadcast message, as the case may be), the end node may attempt to resend the preamble and/or the payload with an adjusted spreading factor for at least the payload. For example, the end node may resend the payload with a spreading factor that is higher than the spreading factor used in the previous transmission for the payload. As another example, the end node may resend the payload with a spreading factor equal to the higher spreading factor used to initially or previously transmit the preamble. As yet another example, the end node may resend the payload with a more robust modulation than that in the previous transmission of the payload.

Further, upon completion of the exchange of data between the end node and the mobile gateway, the mobile gateway may move into a position such that the mobile gateway may establish a connection with the backhaul network and the radio controller. The mobile gateway may transmit the data to the radio controller, which then may relay the data to one or more application servers.

Figure 6:
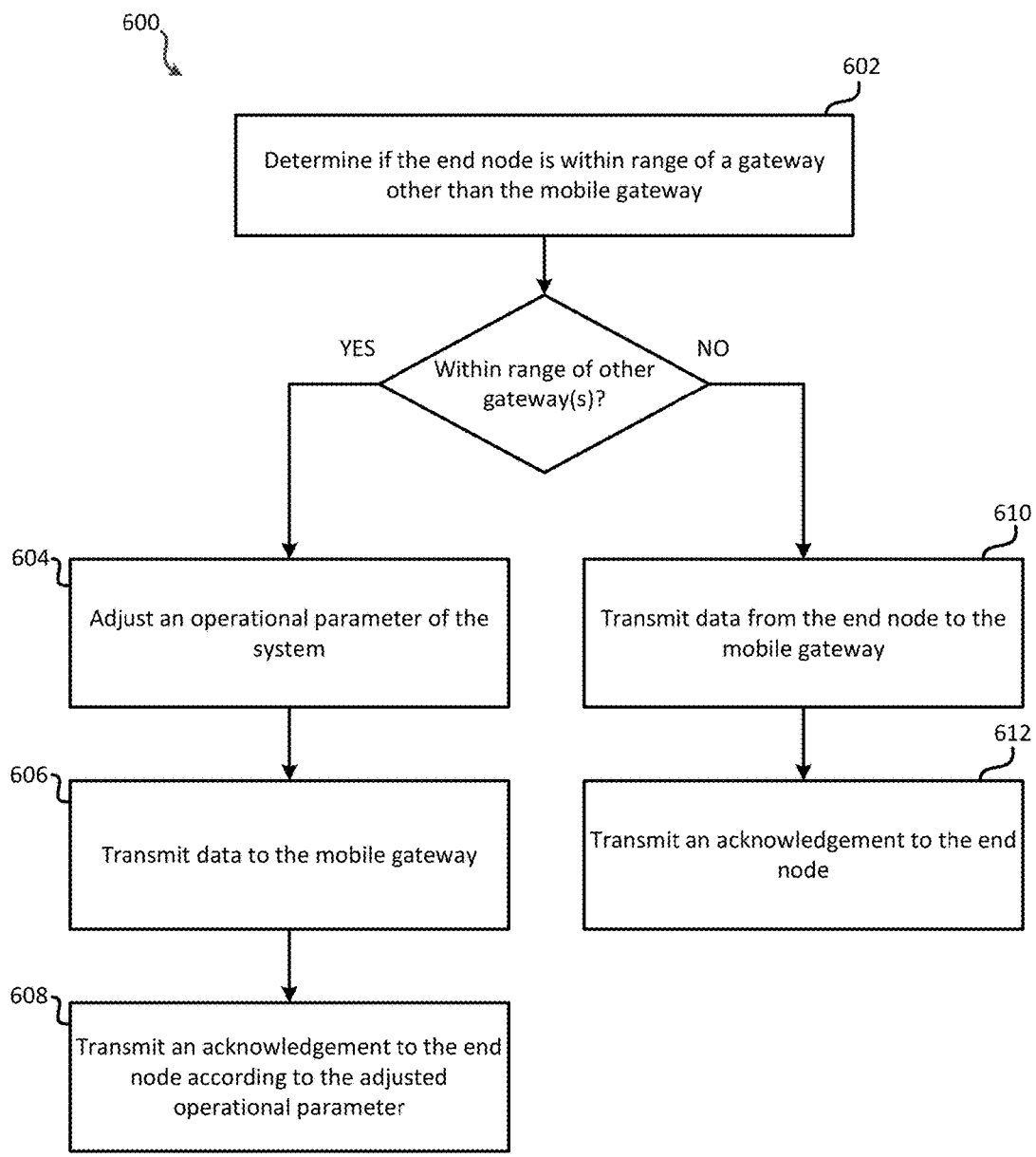
FIG. 6 illustrates a flow chart of an example method according to an embodiment of the present disclosure.

FIG. 6 illustrates a method 600 of facilitating communication between an end node (e.g., the end node 110 of FIG. 1) and one or more mobile gateways (e.g., the mobile gateway 102 of FIG. 1) and one or more fixed gateways (e.g., the fixed gateways 104 of FIG. 1). For example, the method 600 may be implemented in a scenario in which the end node (such as the end node 110*b* of FIG. 1) potentially may be within range of both one or more mobile gateways and one or more fixed gateways. This may be after a mobile gateway has moved within communication range of the end node and thus potentially may perform one or more communications with the end node. In such a scenario, it is desirable that communication with the end node be coordinated so that acknowledgements (e.g., MAC layer acknowledgements) from different gateways are not returned to the end node during the same time interval, which may cause interference with one another. It is noted that the acknowledgements provided by the fixed gateways are typically coordinated by the radio controller. However, since the mobile gateway may not be connected to the backhaul network and the radio controller while the mobile gateway is communicating with the end node, the mobile gateway may not be able to avail itself of this function of the radio controller.

Additionally or alternatively, the method 600 may be implemented in a same or similar manner to facilitate communication between an end node and two or more mobile gateways (e.g., without the involvement of any fixed gateways). For example, the method 600 may be implemented if a first mobile gateway is within range of an end node and a second mobile gateway (or more mobile gateways) is potentially also within range of end node. The method 600 may prevent the first mobile gateway and the second mobile gateway from both transmitting an acknowledgement to the end node during the same time interval (e.g., a receive window of the end node).

At step 602, it may be determined whether the end node is within communication range of one or more gateways beyond the initial first mobile gateway. For example, the first mobile gateway may determine if the end node is within range of one or more other mobile gateways and/or one or more fixed gateways. This determination may be performed according to various techniques.

As one example of determining if the end node is within range of additional gateways beyond the first mobile gateway, the first mobile gateway may broadcast a gateway detection packet, such as via radio transmission. If other mobile gateways or fixed gateways are within sufficient proximity to the broadcasting first mobile gateway, the other mobile gateways or fixed gateways may receive the gateway detection packet. Responsive to receiving the gateway detection packet, the other mobile gateways or fixed gateways may transmit a return packet back to the first mobile gateway. The return packet may comprise information about the gateway from which it was sent, such as the gateway's location (e.g., GPS coordinates), the gateway's transmission power level, and/or the radio frequencies supported by the gateway. Based on the return packet, the first mobile gateway may determine the other gateway's effective coverage area and therefore ascertain whether the end node is within communication range of that other gateway. The return packet may indicate whether the other gateway, particularly in the case of a fixed gateway, has previously communicated with the end node. From this, it may be inferred that the other gateway is within communication range of the end node.

As another example of a technique to determine if the end node is in range of additional gateways, the first mobile gateway may be notified by the end node that the end node has communicated with other gateways recently. For example, an uplink message packet sent from the end node to the first mobile gateway may comprise data indicating that the end node has communicated with (and thus has been in communicative range of) other gateways. The uplink message packet may be one that was transmitted to the first mobile gateway during a previous data exchange with the end node. Or the uplink message packet may be an initial transmission from the end node during a present data exchange between the first mobile gateway and the end node. Thus, the uplink message packet comprising data indicating which, if any, other gateways the end node has communicated with may be leveraged by the first mobile gateway in determining if the mobile first gateway should return an acknowledgement to the end node or even continue with the data exchange. Such data may comprise information relating to those other gateways, including an identifier, location, a type of gateway (e.g., mobile or fixed), and/or operational attributes of those gateways (e.g., transmission power, frequency support, etc.). Such data further may comprise the times of the communications with the other gateways or the elapsed times since the communications with the other gateways. Thus, the first mobile gateway may determine if the end node is in range of other gateways based on the data previously transmitted from the end node indicating which, if any, other gateways the end node has been in communication with.

The determination by the first mobile gateway that the end node is within communication range of other gateways may be communicated to the end node so that the end node may interact with the first mobile gateway accordingly during a data exchange therebetween. For example, the first mobile gateway may transmit data indicative of this determination along with or as part of the beacon message transmitted to the end node to notify the end node that the first mobile gateway is within communication range of the end node, as described in step 508 of the method 500 of FIG. 5.

If it is determined that the end node is within range of other gateways, the method 600 may proceed to step 604. Conversely, if it is determined that the end node is not within range of other gateways, the method 600 may proceed to step 610.

At step 604, an operational parameter of a system (e.g., the system 100 of FIG. 1) and/or component thereof, such as the end node and/or the first mobile gateway, may be adjusted based on the determination that the end node is within range of other gateways.

It will be recalled that the end node may open one or more receive windows during which the end node may be enabled to receive data from a gateway. For example, the data from the gateway may comprise a downlink message packet. The one or more receive windows may be designated and/or opened responsive to the end node transmitting data, such as an uplink message packet, to a gateway. Accordingly, in one example, to help coordinate acknowledgements between the end node and the gateways, including the first mobile gateway attempting to exchange data, the end node may be configured to designate and/or open an additional receive window during which the first mobile gateway may exclusively transmit its acknowledgement. If the end node is otherwise configured to provide first and second successive receive windows, the configuration of the end node may be adjusted to provide a third receive window following the expiration of the second receive window. The third receive window may be designated for receiving the acknowledgement from the first mobile gateway, thereby avoiding interference with acknowledgements received from other gateways during the first and/or second receive windows. The configuration of the first mobile gateway likewise may be adjusted so that the first mobile gateway transmits its acknowledgement during the third receive window. The third receive window (or other additional receive window) and/or time interval thereof may be indicated to the first mobile gateway via the uplink message packet initially transmitted to the first mobile gateway so that the first mobile gateway is enabled to transmit the acknowledgement (e.g., the MAC layer acknowledgment) during the third receive window.

In another example, the configuration of the end node may be adjusted such that the end node may listen for the acknowledgement (e.g., the MAC layer acknowledgement) from the first mobile gateway on a designated frequency channel. The configuration of the first mobile gateway may also be adjusted so that the first mobile gateway may transmit the acknowledgement on the designated frequency channel. Further, the acknowledgement on the designated frequency channel may be transmitted and received during a designated receive window provided by the end node. The acknowledgement on the designated frequency channel may be transmitted and received during a second receive window. Since the acknowledgement may be transmitted on a designated frequency channel, different than the frequency channels on which the other gateways may transmit their acknowledgements, interference with acknowledgements from other gateways may be avoided.

In yet another example, the first mobile gateway and the other gateways in communication range of the end node may communicate with one another to coordinate their respective acknowledgements of an uplink message packet sent from the end node. For example, the first mobile gateway and the other gateways may communicate via radio transmission. The communication between the first mobile gateway and the other gateways may comprise an indication that the respective gateway is in communication range of the end node and/or that the respective gateway has received an uplink message packet from the end node. The communication between the first mobile gateway and the other gateways further may comprise an indication that the respective gateway intends to transmit a MAC layer acknowledgement during a designated receive window provided by the end node. Thus, the other gateways may transmit their respective acknowledgement during a receive window other than the designated received window. For example, the first mobile gateway may communicate to other gateways that the first mobile gateway intends to transmit its acknowledgement to the end node during a second receive window provided by the end node. Accordingly, the other gateways may transmit their respective acknowledgements during a receive window other than the second receive window. The end node may likewise be configured to listen for the acknowledgement from the mobile gateway during the designated receive window.

In another example, the end node may be configured to listen for the acknowledgement from the first mobile gateway during an initial receive window opened by the end node. For example, the end node may listen for the acknowledgement from the first mobile gateway during a first receive window of two or more sequential receive windows.

Since the first mobile gateway may be out of communication with the backhaul network and the radio controller while receiving the uplink message packet from the end node and transmitting a responsive acknowledgement, the first mobile gateway does not need to wait for instructions from the radio controller before transmitting the acknowledgement. Thus, the first mobile gateway may be configured to transmit the acknowledgement immediately (i.e., during the first receive window) upon receiving the uplink message packet from the end node. The end node may include an indicator in the uplink message packet transmitted to the first mobile gateway instructing the mobile gateway to transmit the acknowledgement during the first receive window.

In a further example, the first mobile gateway may establish communication with one or more fixed gateways within communication range with the first mobile gateway and thereby communicate with the radio controller via the one or more fixed gateways. In this manner, the first mobile gateway may be treated similarly as a fixed gateway with respective to coordination of acknowledgements. For example, the end node may transmit an uplink message packet which is received by the first mobile gateway and one or more fixed gateways. The first mobile gateway may transmit the uplink message packet via its connection with the one or more fixed gateways to the radio controller. The fixed gateways may also transmit the uplink message packet received by those fixed gateways to the radio controller. The radio controller may select one gateway from the set of the first mobile gateway and the fixed gateways to transmit a MAC layer acknowledgement. The radio controller may transmit instructions to the selected gateway and that gateway may accordingly transmit an acknowledgement to the end node.

At step 606, data, such as an uplink message packet, may be transmitted to the first mobile gateway. For example, the end node may transmit the data to the first mobile gateway. The first mobile gateway may accordingly receive the data from the end node. It will be appreciated that step 604 and step 606 may be readily performed in any order. That is, the end node may sometimes transmit data to the first mobile gateway before the operational aspect of the end node and/or the gateways is adjusted based on the determination that the end node is in communication range of additional gateways other than the first mobile gateway.

At step 608, responsive to receiving the data (e.g., the uplink message packet) from the end node, a MAC layer acknowledgement may be transmitted to the end node according to the operational parameter adjusted in step 604. The acknowledgement may be transmitted to the end node by the first mobile gateway, another mobile gateway, or one of the fixed gateways, depending on the particular adjustment to the operational parameter.

For example, the end node may open an additional receive window and the mobile gateway may transmit an acknowledgement to the end node during the additional receive window. The other gateways that received the uplink message packet from the end node may not transmit an acknowledgement during this additional receive window.

According to another example, the first mobile gateway may transmit the acknowledgement on a designated frequency channel. Likewise, the end node may receive the acknowledgement on the designated frequency channel. Further, the acknowledgement transmitted on the designated frequency channel may be transmitted to and received by the end node during a designated receive window opened by the end node.

According to yet another example, one of the gateways (e.g., the first mobile gateway, another mobile gateway, or one of the fixed gateways) may transmit an acknowledgement to the end node during a designated receive window based on a communication between the gateways indicating that the gateway intends to transmit the acknowledgement during the designated receive window. The other gateways may not transmit an acknowledgement during the designated receive window.

According to another example, the first mobile gateway may transmit a MAC layer acknowledgment to the end node during an initial receive window opened by the end node. For example, if the end node opens a first receive window and a second window, the first mobile gateway may transmit the acknowledgement during the first receive window.

According to a further example in which the first mobile gateway communicates with the radio controller via a connection with one or more fixed gateways and the radio controller selects a gateway to provide an acknowledgement, the first mobile gateway may transmit an acknowledgement to the end node responsive to an instruction to do so from the radio controller.

As explained in greater detail herein, the data (e.g., the uplink message packet) received from the end node may be transmitted to upstream components, such as the radio controller and/or the application servers. For example, if the first mobile gateway received the uplink message packet from the end node, the first mobile gateway may move to re-establish connection with the backhaul network and thereby transmit the uplink message packet (or data included therein) to the radio controller. The radio controller may transmit the uplink message packet (or data included therein) to one or more of the application servers.

If it is determined that the end node is not within communication range of gateways other than the first mobile gateway the method 600 may proceed to step 610. At step 610, data, such as an uplink message packet, may be transmitted to the first mobile gateway. For example, the end node may transmit the data to the first mobile gateway. The first mobile gateway may thereby receive the data from the end node.

At step 612, responsive to receiving the data from the end node, the first mobile gateway may transmit an acknowledgment to the end node that the first mobile gateway successfully received the data transmitted by the end node. The acknowledgement may be in the form of or included with a downlink message packet. The downlink message packet may further comprise data from upstream components, such as data from the application servers. Multiple back and forth data transmittals and acknowledgments may be similarly performed between the end node and the mobile gateway until all data intended for transmission is exchanged.

As explained in additional detail herein, the first mobile gateway may move or be moved to a position at which it may connect to the backhaul network. Via the backhaul network, the first mobile gateway may transmit the data from the end node to the radio controller, which then may relay the data to one or more application servers.

Figure 7:
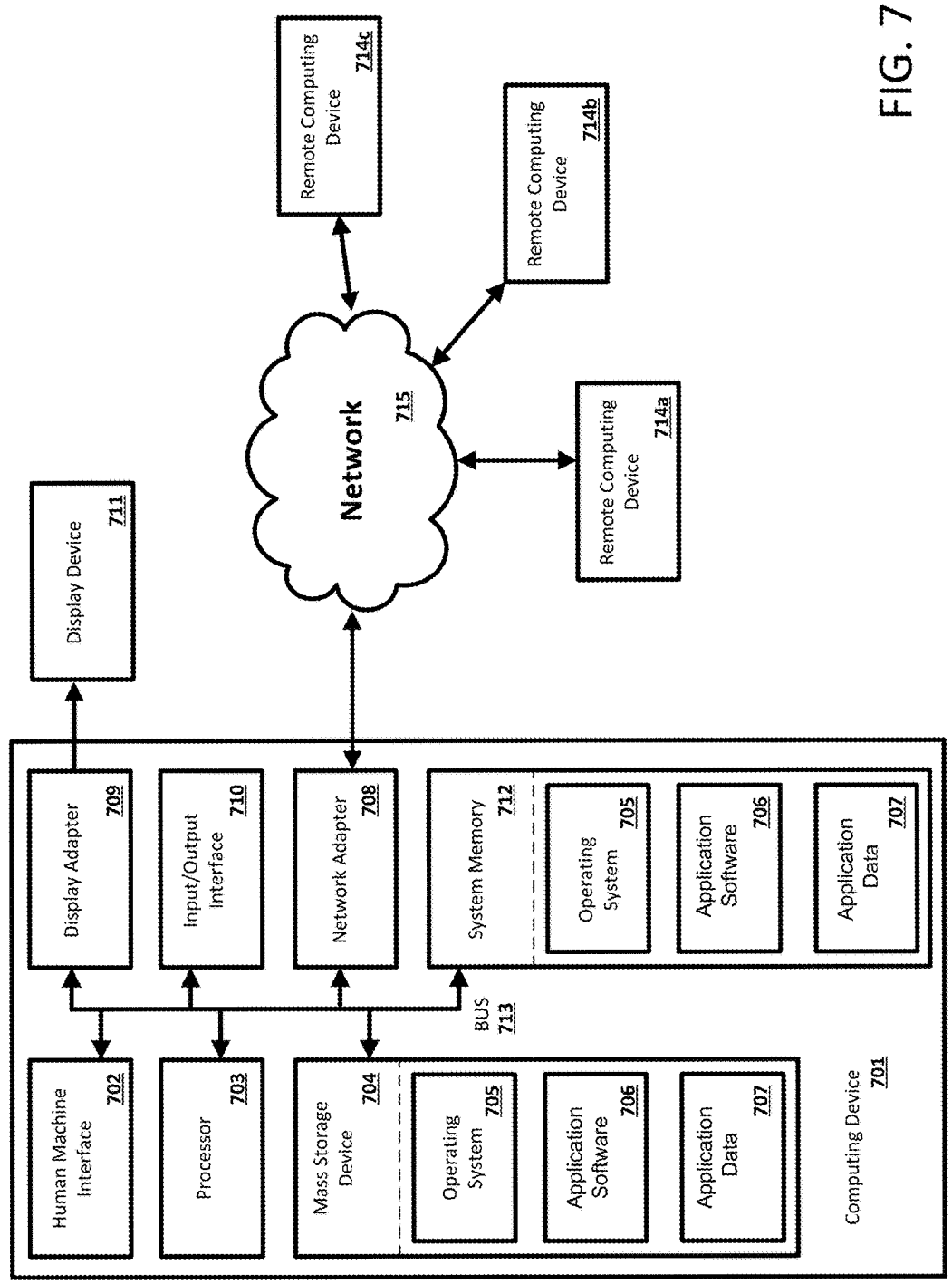
FIG. 7 illustrates a block diagram of an example computing device according to an embodiment of the present disclosure.

The methods and systems may be implemented on a computing device such as a computing device 701 (e.g., computer) as illustrated in FIG. 7 and described below. By way of example, the mobile gateway 102, the fixed gateways 104, the radio controller 106, the application servers 108, and/or the end nodes 110 of FIG. 1 and/or the station 220 of FIG. 2 may be a computing device as illustrated in FIG. 7. Similarly, the methods and systems disclosed may utilize one or more computing device to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 701. The components of the computing device 701 may comprise, but are not limited to, one or more processors 703, a system memory 712, and a system bus 713 that couples various system components including the processor 703 to the system memory 712. In the case of multiple processors 703, the system may utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description may also be implemented over a wired or wireless network connection and each of the subsystems, including the processor 703, a mass storage device 704, an operating system 705, a service software 706, a service data 707, a network adapter 708, system memory 712, an Input/Output Interface 710, a display adapter 709, a display device 711, and a human machine interface 702, may be contained within one or more remote computing devices 714a,b,c at physically separate locations, connected through buses of this form, in effect implementing a fully distributed system.

The computing device 701 typically comprises a variety of computer readable media. Exemplary readable media may be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as service data 707 and/or program modules such as operating system 705 and service software 706 that are immediately accessible to and/or are presently operated on by the processor 703.

The computing device 701 may also comprise other removable/non-removable, volatile/non-volatile computer storage media. By way of example, FIG. 7 illustrates a mass storage device 704 which may provide non-volatile storage of computer code, computer readable instructions, data structures, program modules, and other data for the computing device 701. For example and not meant to be limiting, a mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 704, including by way of example, an operating system 705 and service software 706. Each of the operating system 705 and service software 706 (or some combination thereof) may comprise elements of the programming and the service software 706. Service data 707 may also be stored on the mass storage device 704. Service data 707 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 701 via an input device (not shown). Examples of such input devices comprise, but are not limited to, a keyboard, pointing device (e.g., a "mouse"), a microphone, a joystick, tactile input devices such as gloves, and other body coverings, and the like. These and other input devices may be connected to the processor 703 via a human machine interface 702 that is coupled to the system bus 713, but may be connected by other interface and bus structures, such as a parallel port, game port, an IEEE 1394 Port (also known as a Firewire port), a serial port, or a universal serial bus (USB).

A display device 711 may also be connected to the system bus 713 via an interface, such as a display adapter 709. It is contemplated that the computing device 701 may have more than one display adapter 709 and the computing device 701 may have more than one display device 711. For example, a display device may be a monitor, an LCD (Liquid Crystal Display), or a projector. In addition to the display device 711, other output peripheral devices may comprise components such as speakers (not shown) and a printer (not shown) which may be connected to the computing device 701 via Input/Output Interface 710. Any step and/or result of the methods may be output in any form to an output device. Such output may be any form of visual representation, including, but not limited to, textual, graphical, animation, audio, tactile, and the like. The display 711 and computing device 701 may be part of one device, or separate devices.

The computing device 701 may operate in a networked environment using logical connections to one or more remote computing devices 714a,b,c. By way of example, a remote computing device may be a personal computer, portable computer, smartphone, a server, a router, a network computer, a peer device or other common network node, and so on. Logical connections between the computing device 701 and a remote computing device 714a,b,c may be made via a network 715, such as a local area network (LAN) and a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of service software 706 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
moving a mobile data-handling device to a first position that is within communication range of an end node of a low power wide area network;
receiving, by the mobile data-handling device at the first position, a data packet from the end node;
moving the mobile data-handling device to a second position at which the mobile data-handling device is able to communicate with a data-receiving device associated with the low power wide area network;
causing to connect, at the second position, the mobile data-handling device to the data-receiving device;
transmitting, by the mobile data-handling device, the data packet to the data-receiving device;
receiving, by the mobile data-handling device and from the data-receiving device, a first acknowledgement indicating that a computing device associated with the low power wide area network received the data packet via the data-receiving device; and transmitting, by the mobile data-handling device and to the end node, the first acknowledgement.

2. The method of claim 1, further comprising:
transmitting, by the mobile data-handling device, a second acknowledgement to the end node indicating that the mobile data-handling device received the data packet.

3. The method of claim 2, wherein the second acknowledgement is a MAC layer acknowledgement and the first acknowledgement is an application layer acknowledgement.

4. The method of claim 1, wherein the data packet comprises data collected by the end node.

5. The method of claim 1, wherein the data-receiving device comprises at least one of a wireless access point of a wireless computer network or a cellular base station of a cellular network.

6. The method of claim 1, wherein the first position is a position at which the mobile data-handling device is not in communication with the data-receiving device, and wherein the second position is outside the communication range of the end node.

7. A method comprising:
transmitting schedule information to an end node of a low power wide area network, the schedule information indicative of a time period for a mobile data-handling device to be within communication range of the end node;
moving the mobile data-handling device to a first position that is within communication range of the end node;
transmitting, by the mobile data-handling device and during the time period indicated in the schedule information, a message to the end node indicating that the mobile data-handling device is within communication range of the end node;
receiving, by the mobile data-handling device, from the end node, and via a first spreading factor associated with spread spectrum modulation, a preamble of a data packet;
based on the receiving the preamble and not receiving, by the mobile data-handling device and via a second spreading factor that is lower than the first spreading factor, a payload of the data packet within a predetermined period of time after receiving the preamble, transmitting, by the mobile data-handling device, a negative acknowledgement to the end node indicating that the mobile data-handling device received the preamble but not the payload;
receiving, by the mobile data-handling device and from the end node, the payload of the data packet and
transmitting, by the mobile data-handling device, the data packet to a computing device associated with the low power wide area network.

8. The method of claim 7, wherein the message is transmitted to the end node during a receive window in which the end node is operable to receive a communication from the mobile data-handling device.

9. The method of claim 7, wherein the schedule information comprises a factor indicating a likelihood that the mobile data-handling device will be within communication range of the end node during the time period.

10. The method of claim 7, further comprising:
transmitting, by the mobile data-handling device, an acknowledgement to the end node indicating that the mobile data-handling device received the data packet.

11. The method of claim 10, wherein the acknowledgement is transmitted with data from a component of the low power wide area network.

12. A method comprising:
identifying, by an end node of a low power wide area network, a mobile data-handling device in communication range of the end node;
transmitting, by the end node and to the mobile data-handling device, a first notification that the end node had communicated with a second data-handling device during a prior, pre-determined length of time;
based on the transmitting the first notification, receiving, by the end node, a second notification that a data-handling device other than the mobile data-handling device is within communication range of the end node;
based on the second notification that a data-handling device other than the mobile data-handling device is within communication range of the end node, causing to adjust an operational parameter of the mobile data-handling device or the end node;
transmitting, by the end node and to the mobile data-handling device, a data packet; and
receiving, by the end node and from the mobile data-handling device, an acknowledgement indicating that the mobile data-handling device received the data packet, wherein the receiving the acknowledgement is performed according to at least the adjusted operational parameter.

13. The method of claim 12, wherein adjusting the operational parameter of the mobile data-handling device or the end node comprises designating a receive window during which the end node is enabled to receive communication from the mobile data-handling device, and wherein the acknowledgement is transmitted to the end node during the receive window.

14. The method of claim 12, wherein adjusting the operational parameter of the mobile data-handling device or the end node comprises designating a frequency channel with which the end node receives the acknowledgement from the mobile data-handling device, and wherein the acknowledgement is received by the end node with the designated frequency channel.

15. The method of claim 12, wherein adjusting the operational parameter of the mobile data-handling device or the end node comprises designating a first receive window and a second receive window, different than the first receive window, and wherein the acknowledgement is received, from the mobile data-handling device and by the end node, during the second receive window.

16. The method of claim 15, further comprising:
receiving, by the end node and from at least one of a third data-handling device or the second data-handling device, a second acknowledgement during the first receive window.

17. The method of claim 12, wherein the data-handling device other than the mobile data-handling device comprises a second mobile data-handling device.

18. The method of claim 1, wherein the transmitting, by the mobile data-handling device and to the end node, the first acknowledgment is associated with the mobile data-handling device receiving a second data packet from the end node.

19. The method of claim 7, wherein the payload of the data packet is received by the mobile data-handling device via a third spreading factor that is different from the second spreading factor.

20. The method of claim 12, wherein the first notification comprises at least one of an identifier of the second data-handling device, a location of the second data-handling device, an indication that the second data-handling device is mobile, an indication that the second data-handling device is fixed, a transmission power of the second data-handling device, frequency support of the second data-handling device, a time of the communication with the second data-handling device, or an elapsed time since the communication with the second data-handling device.

\* \* \* \* \*